US00RE42451E

(19) United States
(12) Reissued Patent
Tsai et al.

(10) Patent Number: US RE42,451 E
(45) Date of Reissued Patent: Jun. 14, 2011

(54) METHOD AND DEVICE FOR GENERATING A STABLE POWER CONTROL SIGNAL

(75) Inventors: Chin-Yin Tsai, Taipei (TW); Yi-Lin Lai, Taipei (TW)

(73) Assignee: Han Holdings, LLC, Wilmington, DE (US)

(21) Appl. No.: 12/604,307

(22) Filed: Oct. 22, 2009

Related U.S. Patent Documents

Reissue of:
(64) Patent No.: 7,286,462
Issued: Oct. 23, 2007
Appl. No.: 10/990,909
Filed: Nov. 17, 2004

U.S. Applications:
(60) Provisional application No. 60/520,711, filed on Nov. 17, 2003.

(51) Int. Cl.
*G11B 7/00* (2006.01)

(52) U.S. Cl. ..... 369/59.11; 369/53.26; 369/116

(58) Field of Classification Search ..... None
See application file for complete search history.

(56) References Cited

U.S. PATENT DOCUMENTS

| | | | |
|---|---|---|---|
| 4,390,781 | A | 6/1983 | Musha |
| 4,512,004 | A | 4/1985 | Nonaka et al. |
| 4,707,648 | A | 11/1987 | Minami |
| 4,707,816 | A | 11/1987 | Yonezawa et al. |
| 4,730,290 | A | 3/1988 | Takasago et al. |
| 4,878,211 | A | 10/1989 | Suzuki et al. |
| 5,029,155 | A | 7/1991 | Kenjo et al. |
| 5,146,443 | A | 9/1992 | Iwase et al. |
| 5,199,015 | A | 3/1993 | Edahiro et al. |
| 5,216,659 | A | 6/1993 | Call et al. |
| 5,245,598 | A | 9/1993 | Burroughs |
| 5,297,114 | A | 3/1994 | Itoh et al. |
| 5,367,513 | A | 11/1994 | Bates et al. |
| 5,475,664 | A | 12/1995 | Shimizume et al. |
| 5,504,726 | A | 4/1996 | Semba |

(Continued)

FOREIGN PATENT DOCUMENTS

CN 1407552 4/2003

(Continued)

OTHER PUBLICATIONS

U.S. Appl. No. 12/604,307, Tsai et al.

(Continued)

*Primary Examiner* — Peter Vincent Agustin
(74) *Attorney, Agent, or Firm* — Perkins Coie LLP

(57) ABSTRACT

Method and device for generating a stable power control signal in a CD recorder. The power control signal for controlling a laser diode may be a read level, an erase level and a write level. A pickup device outputs a feedback control signal to a read control circuit, and a read power control voltage is thus obtained. Then, the read power control voltage is inputted to a write control circuit, which generates first and second write power control voltages. The read level equals a reference voltage added by the read power control voltage, the erase level equals the read level added by the first write power control voltage, and the write level equals the erase level added by the second write power control voltage, so the read power control voltage and thus the read, erase and write levels are automatically and dynamically adjusted as the feedback control signal varies.

29 Claims, 4 Drawing Sheets

U.S. PATENT DOCUMENTS

| | | | |
|---|---|---|---|
| 5,563,920 | A | 10/1996 | Fimoff et al. |
| 5,568,464 | A | 10/1996 | Horie |
| 5,587,985 | A | 12/1996 | Sano et al. |
| 5,602,814 | A | 2/1997 | Jaquette et al. |
| 5,623,465 | A | 4/1997 | Sasaki et al. |
| 5,642,340 | A | 6/1997 | Nomura |
| 5,677,935 | A | 10/1997 | Karino |
| 5,703,848 | A | 12/1997 | Hofer |
| 5,710,748 | A | 1/1998 | Hofer |
| 5,732,052 | A | 3/1998 | Ando et al. |
| 5,748,584 | A | 5/1998 | Maezawa |
| 5,844,920 | A | 12/1998 | Zook et al. |
| 6,069,667 | A | 5/2000 | Ueda et al. |
| 6,069,855 | A | 5/2000 | Fuma et al. |
| 6,157,601 | A | 12/2000 | Kao et al. |
| 6,269,058 | B1 | 7/2001 | Yamanoi et al. |
| 6,404,713 | B1 | 6/2002 | Ueki |
| 6,560,173 | B2 | 5/2003 | Shimamura et al. |
| 6,611,123 | B2 | 8/2003 | Ono |
| 6,628,594 | B1 | 9/2003 | Park |
| 6,633,523 | B1 | 10/2003 | Masaki et al. |
| 6,691,203 | B1 | 2/2004 | Chen et al. |
| 6,731,624 | B1 | 5/2004 | Maekawa et al. |
| 6,745,167 | B2 | 6/2004 | Sun |
| 6,757,239 | B2 | 6/2004 | Minamino et al. |
| 6,882,611 | B2 | 4/2005 | Chen |
| 6,906,986 | B2 | 6/2005 | Lee et al. |
| 6,934,227 | B2 | 8/2005 | Nakata et al. |
| 6,970,522 | B1 | 11/2005 | Morling et al. |
| 7,035,176 | B2 | 4/2006 | Tsai |
| 7,092,324 | B2 | 8/2006 | Koh |
| 7,095,693 | B2 | 8/2006 | Sasaki et al. |
| 7,120,100 | B2 | 10/2006 | Hung et al. |
| 7,149,169 | B2 | 12/2006 | Juan et al. |
| 7,242,650 | B2 | 7/2007 | Tsai et al. |
| 7,245,573 | B2 | 7/2007 | Eom |
| 7,286,462 | B2 | 10/2007 | Tsai et al. |
| 7,298,674 | B2 | 11/2007 | Lai et al. |
| 7,349,310 | B2 | 3/2008 | Chen et al. |
| 7,385,896 | B2 | 6/2008 | Lai et al. |
| 7,542,390 | B2 | 6/2009 | Ouyang et al. |
| 7,619,956 | B2 | 11/2009 | Tsai |
| 7,646,682 | B2 | 1/2010 | Lei et al. |
| 2001/0019603 | A1 | 9/2001 | McMahon |
| 2002/0009026 | A1 | 1/2002 | Shimamura et al. |
| 2002/0131350 | A1 | 9/2002 | Kurobe et al. |
| 2003/0048707 | A1 | 3/2003 | Ono |
| 2003/0053387 | A1 | 3/2003 | Lee et al. |
| 2003/0147315 | A1 | 8/2003 | Iwazawa et al. |
| 2003/0169649 | A1 | 9/2003 | Takaoka et al. |
| 2004/0037177 | A1 | 2/2004 | Buchler |
| 2004/0052183 | A1 | 3/2004 | Yu et al. |
| 2004/0130993 | A1 | 7/2004 | Nadershahi |
| 2004/0179451 | A1 | 9/2004 | Morishima et al. |
| 2005/0157606 | A1 | 7/2005 | Hu et al. |
| 2005/0195717 | A1 | 9/2005 | Lai et al. |
| 2005/0251671 | A1 | 11/2005 | Ouyang et al. |
| 2006/0013083 | A1 | 1/2006 | Koh |
| 2006/0039252 | A1 | 2/2006 | Chu |
| 2006/0056555 | A1 | 3/2006 | Oono et al. |
| 2007/0237044 | A1 | 10/2007 | Jin et al. |
| 2008/0205240 | A1 | 8/2008 | Lai et al. |
| 2009/0003163 | A1 | 1/2009 | Chen et al. |

FOREIGN PATENT DOCUMENTS

| | | |
|---|---|---|
| CN | 1481553 | 3/2004 |
| CN | 1519667 | 5/2005 |
| CN | 1619660 | 5/2005 |
| CN | 1619661 | 5/2005 |
| CN | 1619662 | 5/2005 |
| CN | 1619668 | 5/2005 |
| CN | 1629947 | 6/2005 |
| JP | 10040546 | 2/1998 |
| JP | 10083540 | 3/1998 |
| JP | 63117336 | 5/1998 |
| JP | 2001067682 | 3/2001 |
| TW | 200518049 | 6/2005 |
| TW | 200518073 | 6/2005 |
| TW | 200518078 | 6/2005 |
| TW | 200518081 | 6/2005 |
| TW | 200522040 | 7/2005 |
| TW | 200518048 | 12/2006 |
| WO | WO-02/49023 | 6/2002 |

OTHER PUBLICATIONS

Machine Translation of Okamatsu, JP-10-083540, published Mar. 31, 1998.
First Office Action; Application No. TW 93135312 Filed Nov. 17, 2004; Date of Mailing: Feb. 18, 2009, 3 pages [translation attached].
Notice of Allowance; U.S. Appl. No. 10/990,665; Mailed Jan. 29, 2008; 6 pages.
Non-Final Office Action; U.S. Appl. No. 101990,665; Mailed Jul. 17, 2007; 21 pages.
Final Office Action; U.S. Appl. No. 10/990,665; Mailed Oct. 2, 2007; 10 pages.
Non-Final Office Action; U.S. Appl. No. 10/990,860; Mailed Jul. 30, 2007; 9 pages.
Final Office Action; U.S. Appl. No. 10/990,860; Mailed Oct. 17, 2007; 8 pages.
Non-Final Office Action; U.S. Appl. No. 10/990,860; Mailed Feb. 11, 2008; 11 pages.
Final Office Action; U.S. Appl. No. 10/990,860; Mailed Jul. 16, 2008; 7 pages.
Non-Final Office Action; U.S. Appl. No. 10/990,860; Mailed Dec. 9, 2008 9 pages.
Non-Final Office Action; U.S. Appl. No. 10/990,860; Mailed Apr. 17, 2009; 10 pages.
Notice of Allowance for U.S. Appl. No. 10/990,860; Mailed Sep. 10, 2009; 5 pages.
Final Rejection; CN Application No. 2004100683527 filed Aug. 31, 2004; Applicant Via Technologies, inc.; Date of Issue Sep. 4, 2009; 13 pages.
Notice of Allowance; U.S. Appl. No. 10/990,655; Mailed Apr. 2, 2008; 10 pages.
Notice of Allowance; U.S. Appl. No. 10/990,655; Mailed Jul. 24, 2008; 7 pages.
Notice of Allowance; U.S. Appl. No. 10/990,655; Mailed Dec. 23, 2008; 8 pages.
Notice of Allowance; U.S. Appl. No. 10/990,655; Mailed Jun. 11, 2009; 9 pages.
Notice of Allowance; U.S. Appl. No. 10/990,669; Mailed Sep. 20, 2007; 4 pages.
Ex Parte Quayle Office Action; U.S. Appl. No. 10/990,669; Mailed Jul. 13, 2007; 6 pages.
Notice of Allowance; U.S. Appl. No. 10/990,805; Mailed Oct. 26, 2007; 4 pages.
Ex Parte Quayle Office Action; U.S. Appl. No. 101990,805; Mailed Jul. 24, 2007; 7 pages.
Notice of Allowance; U.S. Appl. No. 10/990,909; Mailed Aug. 15, 2007 (9 pgs.).
Notice of Allowance; U.S. Appl. No. 12/021,239; Mailed Dec. 16, 2009; 7 pages.
Non-Final Office Action; U.S. Appl. No. 11/021,679; Mailed Nov. 14, 2007; 12 pages.
Final Office Action; U.S. Appl. No. 11/021,679; Mailed Aug. 18, 2008; 13 pages.
Non-Final Office Action; U.S. Appl. No. 11/021,679; Mailed Mar. 3, 2009; 14 pages.
Non-Final Office Action; U.S. Appl. No. 11/021,679; Mailed Nov. 12, 2009; 18 pages.
Non-Final Office Action; U.S. Appl. No. 11/205,260; Mailed Apr. 6, 2009; 8 pages.
Non-Final Office Action; U.S. Appl. No. 11/205,260; Mailed Aug. 31, 2009; 8 pages.
Notice of Allowance; U.S. Appl. No. 10/907,859; Mailed Jan. 27, 2009; 6 pages.
Notice of Allowance; U.S. Appl. No. 10/907,859; Mailed Sep. 9, 2008, 2009; 7 pages.

METHOD AND DEVICE FOR GENERATING A STABLE POWER CONTROL SIGNAL

Matter enclosed in heavy brackets [ ] appears in the original patent but forms no part of this reissue specification; matter printed in italics indicates the additions made by reissue.

[This application] *This patent application is a reissue application for commonly assigned U.S. Pat. No. 7,286,462, issued Oct. 23, 2007 from U.S. patent application Ser. No. 10/990,909 which* claims the benefit of the U.S. provisional application Ser. No. 60/520,711, filed Nov. 17, 2003, the subject matter of which is incorporated herein by reference.

BACKGROUND OF THE INVENTION

1. Field of the Invention

The invention relates in general to a method and a device for generating a stable power control signal in a CD recorder, and more particularly to a method for controlling a power control signal of a laser diode such that the read power control voltage is automatically and dynamically adjusted as a feedback control signal varies, and a read level, an erase level and a write level of the power control signal are also automatically and dynamically adjusted as the read power control voltage varies.

2. Description of the Related Art

When a conventional CD-RW (CD-ReWritable) recorder is writing a disk, a power control signal for controlling a laser diode may be a read level V_bias, an erase level V_erase and a write level V_write. When the recorder wants to read a CD-RW, the level of the power control signal is the read level V_bias. When the recorder is erasing data on the CD-RW disk, the level of the power control signal is the erase level V_erase. When the recorder wants to write data on the CD-RW disk, the level of the power control signal is the write level V_write. The power control signal controls the laser diode to generate a laser beam to read, erase, or write the CD-RW disk.

The CD-RW recorder further has a monitor diode for generating a current $i_M$ according to the intensity of the laser beam generated by the laser diode. An OP amplifier processes the current $i_M$ and then generates a feedback control signal FPDO. FIG. 1 shows a waveform of a feedback control signal FPDO generated when the conventional CD-RW recorder is writing. In the time slot T1, the CD-RW recorder is reading the disk. In the time slot T2, the CD-RW recorder is erasing the data on the disk. In the time slot T3, the CD-RW recorder forms the land of the CD-RW disk. In the time slot T4, the CD-RW recorder forms a pit on the disk.

In general, the read level V_bias, the erase level V_erase and the write level V_write are generated by generating a read power control voltage VRDCO, a first write power control voltage VW1DCO and a second write power control voltage VW2DCO. The read level V_bias equals a sum of a reference voltage Vref and the read power control voltage VRDCO, the erase level V_erase equals a sum of the read level V_bias and the first write power control voltage VW1DCO, and the write level V_write equals a sum of the erase level V_erase and the second write power control voltage VW2DCO.

FIG. 2 is a block diagram showing a circuit for generating three power control voltages in a conventional CD recorder. A read DAC (Digital-to-Analog Converter, RDAC) 202 selects one of a plurality of stored digital values, converts the selected digital value into an analog signal A1, and outputs the analog signal A1 to a first low-pass filter (LPF) 204 in order to obtain the read power control voltage VRDCO. In the correction process before the product is shipped out, a most suitable digital value may be corrected as the output of the RDAC 202. On the other hand, the first write power control voltage VW1DCO and the second write power control voltage VW2DCO are generated as follows. First, the feedback control signal FPDO is inputted to a sample and hold circuit (S/H) 206, which generates an analog signal A2. On the other hand, a write target value digital-to-analog converter (WDAC) 208 selects one of the digital values and converts the selected digital value into an analog signal A3 for output. The analog signal A2 and the analog signal A3 are added together to obtain a sum, and then the sum is inputted to a second low-pass filter 210 to obtain a first power control voltage VW1DCO. An amplifier 212 with the gain G amplifies the first power control voltage VW1DCO by G times to obtain a second power control voltage VW2DCO.

The S/II 206 samples the feedback control signal FPDO according to a pulse signal E_Pulse of FIG. 1 during the erasing operation. The first power control voltage VW1DCO may be adjusted as the feedback control signal FPDO varies through a close loop control system composed of the S/H 206 and the second LPF 210.

However, because the circuit for generating the read power control voltage VRDCO is an open loop control system, the read power control voltage VRDCO will change as the temperature rises after a long term usage of the recorder. At this time, the read level V_bias, the first power control voltage VW1DCO and the second power control voltage VW2DCO will shift and errors occur, and the write quality is influenced.

SUMMARY OF THE INVENTION

It is therefore an object of the invention to provide a method and a device for generating a stable power control signal, wherein the method and device can effectively improve the problem of the varying power control signal caused by the temperature variation in the long-term writing process.

The invention achieves the above-identified object by providing a CD recorder having a power control signal. The power control signal has a read level, an erase level and a write level. The read level equals a sum of a reference voltage and a read power control voltage, the erase level equals a sum of the read level and a first write power control voltage, and the write level equals a sum of the erase level and a second write power control voltage. The CD recorder of the invention includes a pickup device, a read control circuit and a write control circuit. The pickup device is for reading, erasing or writing a disk and generating a feedback control signal. The pickup device includes a laser diode and a monitor diode. The laser diode receives the power control signal, which enables the laser diode to generate a laser beam to read, erase or write the disk. The monitor diode senses intensity of the laser beam. The CD recorder generates the feedback control signal according to the intensity of the laser beam sensed by the monitor diode. The read control circuit has a read target value digital-to-analog converter for storing a plurality of first digital values and converting one of the first digital values into a first analog value. The read control circuit generates the read power control voltage according to the feedback control signal and the first analog value. The write control circuit has a write target value digital-to-analog converter for storing a plurality of second digital values and converting one of the second digital values into a second analog value. The write control circuit generates the first write power control voltage and the second write power control voltage according to the read power control voltage and the second analog value. The read power control voltage is automatically and dynamically adjusted as the feedback control signal varies, such that the read level, the erase level and the write level of the power control signal are also automatically and dynamically adjusted as the read power control voltage varies.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
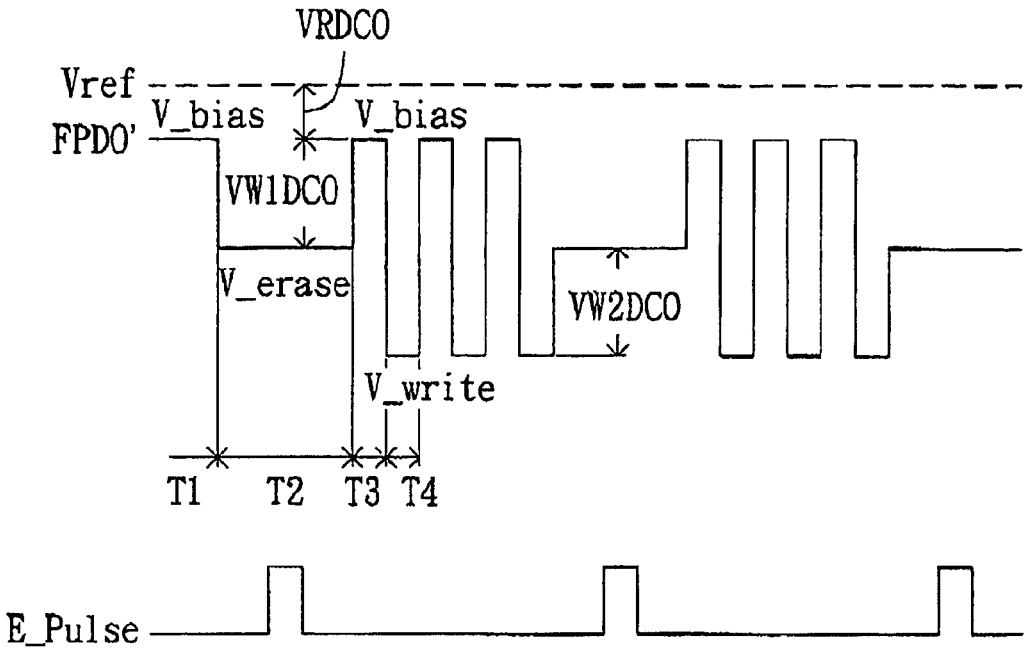
FIG. 1(PRIOR ART)
FIG. 1 shows a waveform of a feedback control signal FPDO.
Figure 2:
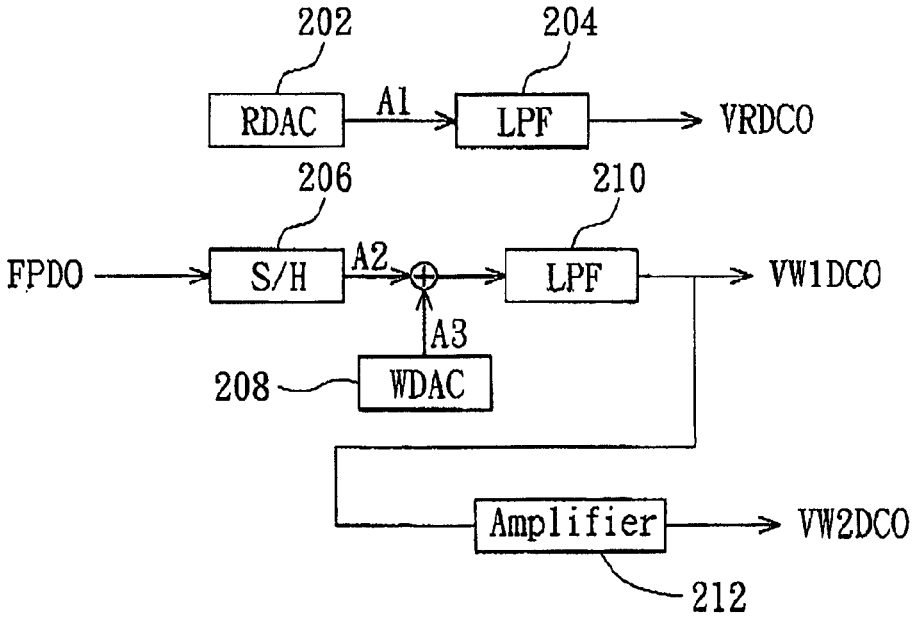
FIG. 2(PRIOR ART)
FIG. 2 is a block diagram showing a circuit for generating three power control voltages in a conventional CD recorder.
Figure 3:
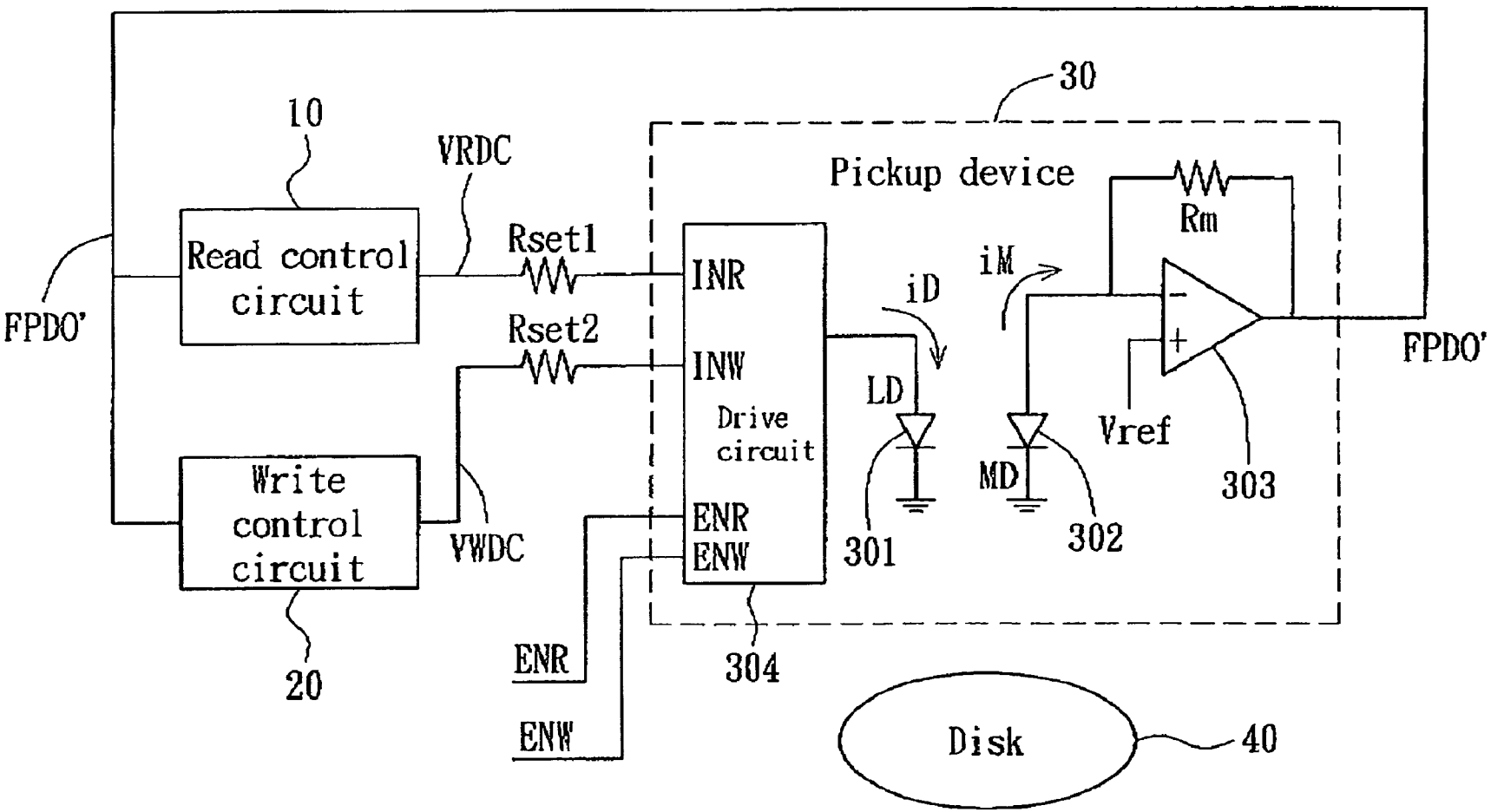
FIG. 3 is a block diagram showing a device of the invention for generating a stable power control signal.

FIG. 3 is a block diagram showing a device of the invention for generating a stable power control signal. A pickup device 30 is utilized to read, erase or write a disk 40 and generate a feedback control signal FPDO'. The pickup device 30 has a laser diode 301 and a monitor diode 302. The laser diode 301 receives the power control signal to enable the laser diode 301 to generate a laser beam to read, erase or write the disk 40. The pickup device 30 generates the feedback control signal FPDO' according to the intensity of the laser beam sensed by the monitor diode 302.

Figure 5:
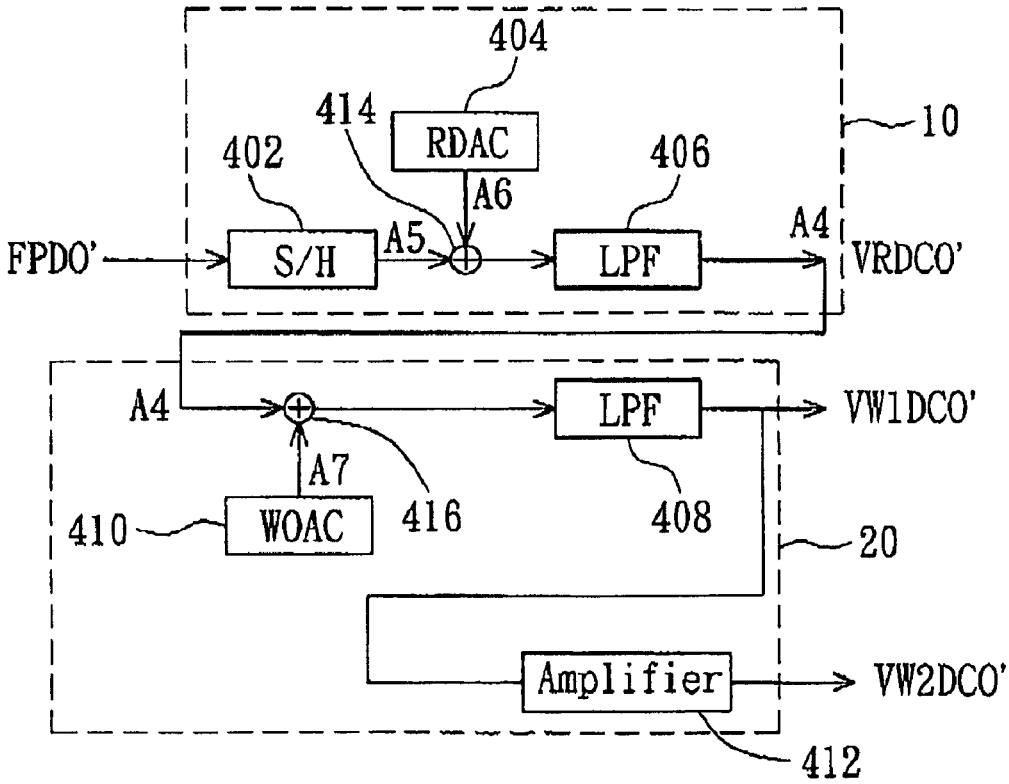
FIG. 5 is a circuit block diagram showing a device of the invention for generating three power control voltages.

FIG. 5 is a circuit block diagram showing a device of the invention for generating three power control voltages. A read control circuit 10 has a read target value digital-to-analog converter 404 for storing multiple first digital values and converting one of the first digital values into a first analog value A6. The read control circuit 10 is for generating a read power control voltage VRDCO' according to the feedback control signal FPDO' and the first analog value A6. A write control circuit 20 has a write target value digital-to-analog converter 410 for storing multiple second digital values and converting one of the second digital values into a second analog value A7. The write control circuit 20 is for generating a first write power control voltage VW1DCO' and a second write power control voltage VW2DCO' according to the read power control voltage VRDCO' and the second analog value A7. The read control circuit 10 further includes a sample and hold circuit 402, a subtracter 414 and a first low-pass filter 406, and the write control circuit further includes an adder 416, an amplifier 412 and a second low-pass filter 408.

Figure 4:
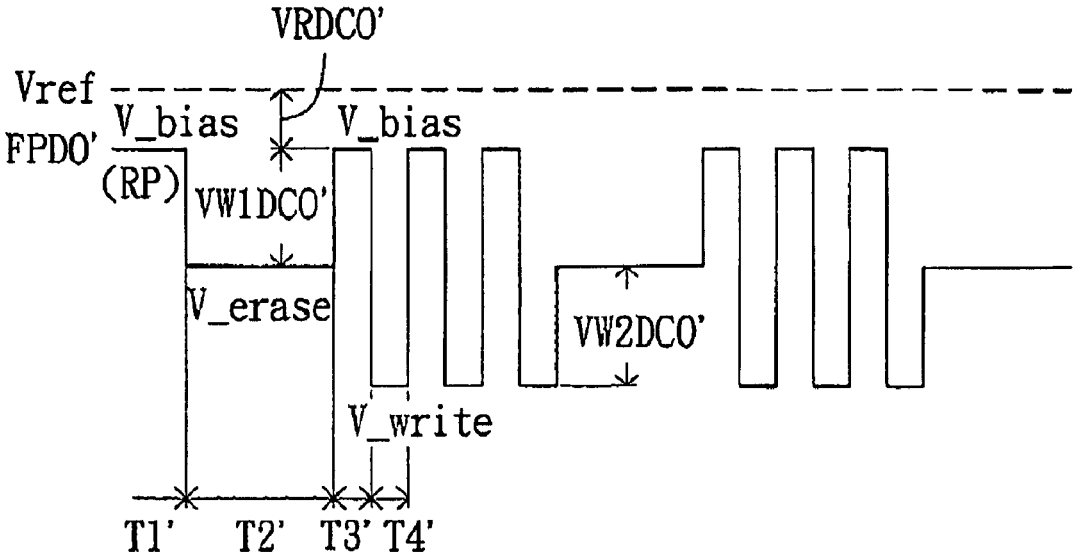
FIG. 4 shows a waveform of a feedback control signal FPDO'.

FIG. 4 shows a waveform of the feedback control signal FPDO'. The CD recorder has a power control signal, which has a read level V_bias, an erase level V_erase and a write level V_write. As shown in FIG. 4, the read level V_bias equals a sum of the reference voltage Vref and the read power control voltage VRDCO', the erase level V_erase equals a sum of the read level V_bias and the first write power control voltage VW1DCO', and the write level V_write equals a sum of the erase level V_erase and the second write power control voltage VW2DCO'. The read level V_bias enables the laser diode to generate a read power P_bias, the erase level V_erase enables the laser diode to generate an erase power P_erase, and the write level V_write enables the laser diode to generate a write power P_write. In order to keep the write quality, the read power P_bias, the erase power P_erase and the write power P_write have to be kept constant.

Please refer to FIG. 5. The feedback control signal FPDO' is inputted to the sample and hold circuit (S/H) 402, which generates a third analog signal A5. The read target value digital-to-analog converter (BDAC) 404 selects one of the stored digital values, and converts the selected digital values into a first analog signal A6 for output. The third analog signal A5 is subtracted from the first analog signal A6 to obtain a difference, which is inputted to the low-pass filter 406 to obtain the read power control voltage VRDCO'.

On the other hand, the write target value digital-to-analog converter (WDAC) 410 selects one of the stored digital values, and converts the selected digital values into a second analog signal A7 for output. The read power control voltage VRDCO', which is inputted form the A4 end, and the second analog signal A7 are added together to obtain a sum, which is inputted to the low-pass filter 408 to obtain the first write power control voltage VW1DCO'. The amplifier 412 amplifies the first write power control voltage VW1DCO' by G' times to obtain the second write power control voltage VW2DCO'.

In this case, the read power control voltage VRDCO' is generated in a close loop control manner by feeding back the feedback control signal FPDO'. The first write power control voltage VW1DCO' and the second write power control voltage VW2DCO' are generated in an open loop control manner. Thus, when the recorder is used for a long time such that the temperature of the laser diode 301 rises, the read power control voltage VRDCO' is automatically and dynamically adjusted as the level of the feedback control signal FPDO' varies.

Figure 6:
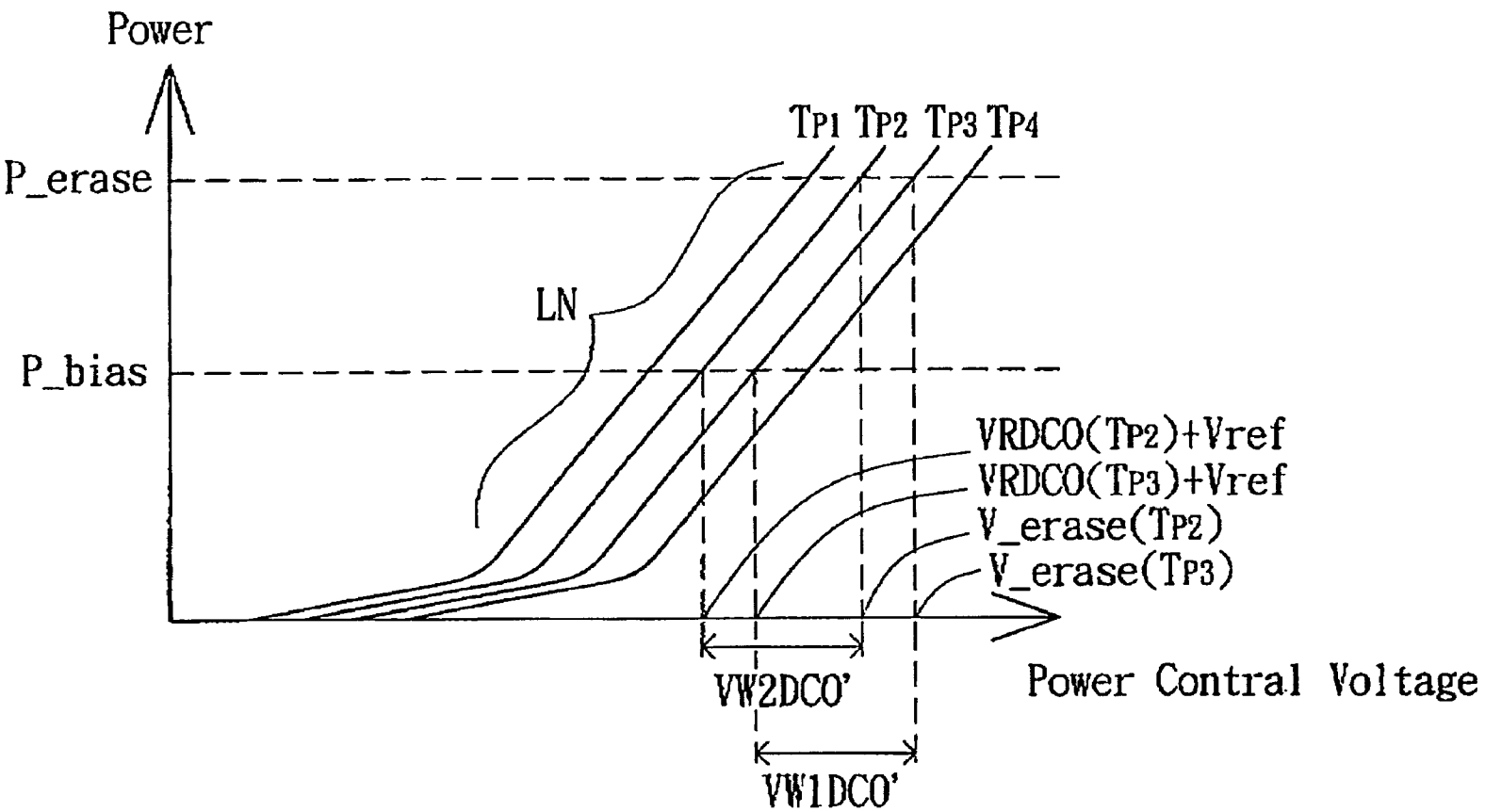
FIG. 6 is a graph showing characteristic curves of the power control voltage V.S. the light-emitting power.

FIG. 6 is a graph showing characteristic curves of the power control voltage V.S. the light-emitting power of the laser diode 301. Taking the curve of temperature TP2 as an example, the read level V_bias(TP2) equal to (Vref+VRDCO'(TP2)) enables the laser diode to generate the read power P_bias, and the erase level V_erase(TP2) equal to (Vref+VRDCO'(TP2)+VW1DCO') enables the laser diode to generate the erase power P_erase. When the recorder is used for a long time, the feedback control signal FPDO' enables the read power control voltage VRDCO' to be adjusted to a voltage, such as VRDCO'(TP3), capable of enabling the laser diode to generate the read power P_bias according to the close loop control system composed of the sample and hold circuit (S/H) 402 and the low-pass filter 406. At this time, the read level V_bias equals Vref+VRDCO'(TP3).

In this case, because the first write power control voltage VW1DCO' is generated in an open loop control manner, the value of the first write power control voltage VW1DCO' basically does not tend to vary as the temperature changes, and the relationship between VW2DCO' and VW1DCO is only determined by the magnification power G' of the amplifier 412. Consequently, the erase level V_erase at this time equals (Vref+VRDCO'(TP3)+VW1DCO').

The characteristic curves of the laser diode 301 have a linear zone LN. No matter how the temperature changes, the slope in the linear zone LN is kept constant. Because the erase level V_erase is still in the linear zone after it is risen to (Vref+VRDCO'(TP3)+VW1DCO'), the erase level V_erase at this time still enables the laser diode to generate the erase power P_erase.

Before the product of the invention is shipped out, an optimum setting value is obtained after the first write power control voltage VW1DCO' is corrected. When the recorder is used, the read power control voltage VRDCO' is dynamically adjusted as the feedback control signal FPDO' varies, and simultaneously enables the erase level V_erase and the write level V_write to be dynamically adjusted as the feedback control signal FPDO' varies. So, the invention can dynamically adjust the read level V_bias, the erase level V_erase and the write level V_write with the temperature variation, such that the laser diode generates the constant read power P_bias, erase power P_erase and write power P_write to keep the write quality of the recorder.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A CD recorder having a power control signal, which has a read level, an erase level and a write level, wherein the read level equals a sum of a reference voltage and a read power control voltage, the erase level equals a sum of the read level and a first write power control voltage, and the write level equals a sum of the erase level and a second write power control voltage, the CD recorder comprising:

a pickup device for reading, erasing or writing a disk and generating a feedback control signal, the pickup device comprising:

a laser diode for receiving the power control signal, which enables the laser diode to generate a laser beam to read, erase or write the disk; and a monitor diode for sensing intensity of the laser beam, wherein the CD recorder generates the feedback control signal according to the intensity of the laser beam sensed by the monitor diode;

a read control circuit having a read target value digital-to-analog converter for storing a plurality of first digital values and converting one of the first digital values into a first analog value, wherein the read control circuit generates the read power control voltage according to the feedback control signal and the first analog value; and a write control circuit having a write target value digital-to-analog converter for storing a plurality of second digital values and converting one of the second digital values into a second analog value, wherein the write control circuit generates the first write power control voltage and the second write power control voltage according to the read power control voltage and the second analog value, wherein the read power control voltage is automatically and dynamically adjusted as the feedback control signal varies, such that the read level, the erase level and the write level of the power control signal are also automatically and dynamically adjusted as the read power control voltage varies.

2. The CD recorder according to claim 1, wherein the read control circuit further has:

a sample and hold circuit for receiving the feedback control signal and obtaining a third analog value;

a subtracter for subtracting the third analog value from the first analog value and outputting a difference between the first and third analog values; and a first low-pass filter for receiving the outputted difference of the subtracter and obtaining the read power control voltage.

3. The CD recorder according to claim 2, wherein the write control circuit further has:

an adder for adding the read power control voltage and the second analog value together to obtain a sum, and outputting the sum to a second low-pass filter so as to obtain the first write power control voltage; and an amplifier for receiving the first write power control voltage and obtaining the second write power control voltage.

4. The CD recorder according to claim 3, wherein the read power control voltage is generated in a close loop control manner by feeding back the feedback control signal, and the first write power control voltage and the second write power control voltage are generated in an open loop control manner.

5. The CD recorder according to claim 4, wherein a magnification power exists in a relationship between the first and second write power control voltages outputted from the write control circuit.

6. The CD recorder according to claim 5, wherein the write target value digital-to-analog converter has an optimum setting value obtained after correction before the CD recorder is shipped out.

7. A method for generating a stable power control signal in a read control circuit and a write control circuit of a CD recorder, wherein the CD recorder has a laser diode and a monitor diode, the laser diode generates a laser beam to read, erase or write a disk, the CD recorder generates a feedback control signal according to intensity of the laser beam sensed by the monitor diode, the method enables the read control circuit to generate a read power control voltage and the write control circuit to generate a first write power control voltage and a second write power control voltage, the power control signal for controlling the laser diode has a read level, an erase level and a write level, the read level equals a sum of a reference voltage and the read power control voltage, the erase level equals a sum of the read level and the first write power control voltage, and the write level equals a sum of the erase level and the second write power control voltage, the method comprising the steps of:

inputting the feedback control signal to the read control circuit to obtain the read power control voltage; and inputting the read power control voltage to the write control circuit to generate the first write power control voltage and the second write power control voltage, wherein the read power control voltage is automatically and dynamically adjusted as the feedback control signal varies, such that the read level, the erase level and the write level of the power control signal are also automatically and dynamically adjusted as the read power control voltage varies.

8. The method according to claim 7, wherein the read level enables the laser diode to generate a read power, the erase level enables the laser diode to generate an erase power, and the write level enables the laser diode to generate a write power.

9. The method according to claim 7, wherein the read power control voltage is generated in a close loop control manner by feeding back the feedback control signal, and the first write power control voltage and the second write power control voltage are generated in an open loop control manner.

10. A control device for generating a stable power control signal in a CD recorder, the CD recorder using a power control signal to access an optical disk, the power control signal having a read level, an erase level and a write level, the read level equaling a sum of a reference voltage and a read power control voltage, the erase level equaling a sum of the read level and a first write power control voltage, and the write level equaling a sum of the erase level and a second write power control voltage, the control device comprising:

a read control circuit having a read target value digital-to-analog converter for storing a plurality of first digital values and converting one of the first digital values into a first analog value, the read control circuit generating the read power control voltage according to the feedback control signal and the first analog value; and a write control circuit having a write target value digital-to-analog converter for storing a plurality of second digital values and converting one of the second digital values into a second analog value, the write control circuit generating the first write power control voltage and the second write power control voltage according to the read power control voltage and the second analog value, wherein the read power control voltage is automatically and dynamically adjusted as the feedback control signal varies, such that the read level, the erase level and the write level of the power control signal are also automatically and dynamically adjusted as the read power control voltage varies.

11. The control device according to claim 10, wherein the read control circuit further has:

a sample and hold circuit for receiving the feedback control signal and obtaining a third analog value;

a subtracter for subtracting the third analog value from the first analog value and outputting a difference between the first and third analog values; and a first low-pass filter for receiving the outputted difference of the subtracter and obtaining the read power control voltage.

12. The control device according to claim 11, wherein the write control circuit further has:

an adder for adding the read power control voltage and the second analog value together to obtain a sum, and outputting the sum to a second low-pass filter so as to obtain the first write power control voltage; and an amplifier for receiving the first write power control voltage and obtaining the second write power control voltage.

13. The control device according to claim 12, wherein the read power control voltage is generated in a close loop control manner by feeding back the feedback control signal, and the first write power control voltage and the second write power control voltage are generated in an open loop control manner.

14. The control device according to claim 13, wherein a magnification power exists in a relationship between the first and second write power control voltages outputted from the write control circuit.

15. The control device according to claim 14, wherein the write target value digital-to-analog converter has an optimum setting value obtained after correction before the CD recorder is shipped out.

16. The control device according to claim 14, wherein the CD recorder comprising:

a pickup device for reading, erasing or writing the optical disk and generating a feedback control signal, the pickup device comprising:

a laser diode for receiving the power control signal, which enables the laser diode to generate a laser beam to read, erase or write the disk; and a monitor diode for sensing intensity of the laser beam, wherein the CD recorder generates the feedback control signal according to the intensity of the laser beam sensed by the monitor diode.

*17. A method for providing power control signals in an optical disk drive, comprising:*

*receiving a feedback control signal that is based on an intensity of a laser output of the optical disk drive;*

*providing a read power control signal according to the feedback control signal;*

*providing a first write power control signal according to the read power control signal; and*

*providing a second write power control signal according to the read power control signal.*

*18. The method according to claim 17, further comprising:*

*inputting the feedback control signal to a read control circuit of the optical disk drive to generate the read power control signal; and*

*inputting the read power control signal to a write control circuit of the optical disk drive to generate the first write power control signal and the second write power control signal.*

*19. The method according to claim 17, wherein the laser output has a read level, an erase level, and a write level, further wherein:*

*the read level equals a sum of a reference signal of the laser output and the read power control signal;*

*the erase level equals a sum of the read level and the first write power control signal; and*

*the write level equals a sum of the erase level and the second write power control signal.*

*20. The method according to claim 19, wherein the read power control signal is automatically and dynamically adjusted as the feedback control signal varies, such that the read level, the erase level and the write level are also automatically and dynamically adjusted as the read power control signal varies.*

*21. The method according to claim 19, wherein the read level enables a laser diode associated with the laser output to generate a read power, the erase level enables the laser diode to generate an erase power, and the write level enables the laser diode to generate a write power.*

*22. The method according to claim 17, wherein the read power control signal is generated in a close loop control manner by feeding back the feedback control signal, and the first write power control signal and the second write power control signal are generated in an open loop control manner.*

*23. A control device for providing power control signals in an optical disk drive, comprising:*

*a feedback control circuit configured to receive a feedback control signal that is based on an intensity of a laser output of the optical disk drive;*

*a read control circuit configured to provide a read power control signal according to the feedback control signal;*

*a write control circuit configured to provide a first write power control signal according to the read power control signal, and to provide a second write power control signal according to the read power control signal.*

*24. The control device according to claim 23, wherein the laser output has a read level, an erase level, and a write level, wherein:*

*the read level is approximately equal to a sum of a reference signal of the laser output and the read power control signal;*

*the erase level is approximately equal to a sum of the read level and the first write power control signal; and*

*the write level is approximately equal to a sum of the erase level and the second write power control signal.*

*25. The control device according to claim 24, wherein the read control circuit is configured to automatically and dynamically adjust the read power control signal as the feedback control signal varies, enabling the read level, the erase level and the write level to also be automatically and dynamically adjusted as the read power control signal varies.*

*26. The method according to claim 23, wherein the read control circuit generates the read power control signal in a close loop control manner by feeding back the feedback control signal, and wherein write control circuit generates the first write power control signal and the second write power control signal in an open loop control manner.*

*27. A control device for providing power control signals in an optical disk drive, comprising:*

*a feedback control means for receiving a feedback control signal that is based on an intensity of a laser output of the optical disk drive;*

*a read control means for providing a read power control signal according to the feedback control signal;*

*a write control means for providing a first write power control signal according to the read power control signal, and further to provide a second write power control signal according to the read power control signal.*

*28. The control device according to claim 27, wherein the laser output has a read level, an erase level, and a write level, wherein:*

*the read level is approximately equal to a sum of a reference signal of the laser output and the read power control signal;*

*the erase level is approximately equal to a sum of the read level and the first write power control signal; and*

*the write level is approximately equal to a sum of the erase level and the second write power control signal.*

*29. The control device according to claim 28, wherein the read control means automatically and dynamically adjusts the read power control signal as the feedback control signal varies, enabling the read level, the erase level and the write level to also be automatically and dynamically adjusted as the read power control signal varies.*

* * * * *

UNITED STATES PATENT AND TRADEMARK OFFICE

CERTIFICATE OF CORRECTION

PATENT NO. : RE42,451 E
APPLICATION NO. : 12/604307
DATED : June 14, 2011
INVENTOR(S) : Tsai et al.

It is certified that error appears in the above-identified patent and that said Letters Patent is hereby corrected as shown below:

On the Title page, item (73), under "Assignee", in Column 1, Line 1, delete "Han" and insert -- Tian --.

Page 2, item (56), under "Other Publications", in Column 2, Line 7, delete "101990,665;" and insert -- 10/990,665; --.

Page 2, item (56), under "Other Publications", in Column 2, Line 42, delete "101990,805;" and insert -- 10/990,805; --.

In the Specification:

Column 1, line 10, above "[This application].....herein by reference." insert -- *CROSS-REFERENCE TO RELATED APPLICATIONS* --.

In the Claims:

Column 9, line 7, in Claim 26, delete "method" and insert -- control device --.

Signed and Sealed this
First Day of November, 2011

David J. Kappos
*Director of the United States Patent and Trademark Office*